United States Patent
Masuyama

(10) Patent No.: US 8,422,054 B2
(45) Date of Patent: Apr. 16, 2013

(54) REMOTE COPY SYSTEM, IMAGE FORMING APPARATUS, CONTROL METHOD THEREFOR, AND STORAGE MEDIUM

(75) Inventor: Yuka Masuyama, Yokohama (JP)

(73) Assignee: Canon Kabushiki Kaisha (JP)

( * ) Notice: Subject to any disclaimer, the term of this patent is extended or adjusted under 35 U.S.C. 154(b) by 1204 days.

(21) Appl. No.: 12/026,848

(22) Filed: Feb. 6, 2008

(65) Prior Publication Data

US 2008/0192280 A1 Aug. 14, 2008

(30) Foreign Application Priority Data

Feb. 8, 2007 (JP) ................................ 2007-029492

(51) Int. Cl.
*B41J 1/00* (2006.01)
(52) U.S. Cl.
USPC .......... 358/1.15; 358/1.9; 358/1.11; 358/1.13
(58) Field of Classification Search ................. 358/1.9, 358/1.11, 1.13, 1.15, 1.1; 709/202, 224
See application file for complete search history.

(56) References Cited

U.S. PATENT DOCUMENTS

| | | | | |
|---|---|---|---|---|
| 5,333,246 | A * | 7/1994 | Nagasaka ..................... | 345/619 |
| 6,348,971 | B2 * | 2/2002 | Owa et al. .................... | 358/1.15 |
| 6,985,245 | B1 * | 1/2006 | Takahashi .................... | 358/1.15 |
| 7,054,899 | B1 * | 5/2006 | Yamamoto .................... | 709/202 |
| 2001/0043357 | A1 | 11/2001 | Owa et al. | |
| 2002/0097415 | A1 * | 7/2002 | Chang et al. ................. | 358/1.13 |
| 2004/0169881 | A1 * | 9/2004 | Sato ............................. | 358/1.15 |
| 2005/0111053 | A1 | 5/2005 | Yoshida et al. | |
| 2005/0270557 | A1 * | 12/2005 | Ookuma ...................... | 358/1.13 |
| 2005/0286080 | A1 * | 12/2005 | Lee et al. ..................... | 358/1.15 |
| 2006/0002614 | A1 * | 1/2006 | LeHenaff ..................... | 382/242 |

FOREIGN PATENT DOCUMENTS

| | | |
|---|---|---|
| CN | 1619438 A | 5/2005 |
| JP | 10-013580 A | 1/1998 |
| JP | 2000-209377 A | 7/2000 |
| JP | 2004-356810 A | 12/2004 |

OTHER PUBLICATIONS

Notification of First Office Action issued in corresponding Chinese Patent Application No. 2008100064489 dated Oct. 16, 2009.
English translation of Japanese Office Action to corresponding JP 2007-029492, cited in an IDS dated Nov. 9, 2011.
Office Action issued Sep. 13, 2011 for corresponding JP Patent Application No. 2007-029492.

* cited by examiner

*Primary Examiner* — King Poon
*Assistant Examiner* — Allen H Nguyen
(74) *Attorney, Agent, or Firm* — Rossi, Kimms & McDowell LLP

(57) ABSTRACT

A remote copy system capable of improving the quality of an image formed by remote copy. The remote copy system includes a plurality of image forming apparatuses connected to a network. A controller unit of a local apparatus that reads an image of an original accepts input settings and determine an image process to be executed, based on the input settings. The controller unit determines an image forming apparatus that is to execute the determined image process, based on performance of each of image forming apparatuses connected to a network. Remote copy is executed by causing the determined image forming apparatus to perform the determined image process on data of the image of the original read by the local apparatus, and causing a remote apparatus to perform image formation based on the processed image data.

14 Claims, 12 Drawing Sheets

FIG. 2

| APPARATUS | TYPE | COLOR/ MONOCHROME | SCANNER RESOLUTION (dpi) | PRINTER RESOLUTION (dpi) | COLOR SPACE | COLOR PROCESSING SPEED | VECTORIZATION SPEED | RENDERING SPEED |
|---|---|---|---|---|---|---|---|---|
| IMAGE FORMING APPARATUS 101 | DIGITAL COPYING MACHINE | COLOR | 600 | 600 | RGB | HIGH | HIGH | HIGH |
| IMAGE FORMING APPARATUS 102 | DIGITAL COPYING MACHINE | COLOR | 1200 | 1200 | RGB | HIGH | LOW | LOW |
| IMAGE FORMING APPARATUS 103 | PRINTER | COLOR | - | 1200 | CMYK | HIGH | MEDIUM | MEDIUM |
| IMAGE FORMING APPARATUS 104 | DIGITAL COPYING MACHINE | MONOCHROME | 1200 | 1200 | BW | - | HIGH | LOW |
| IMAGE FORMING APPARATUS 105 | DIGITAL COPYING MACHINE | COLOR | 1200 | 1200 | CMYK | MEDIUM | LOW | HIGH |
| IMAGE FORMING APPARATUS 106 | PRINTER | MONOCHROME | - | 1200 | BW | - | LOW | LOW |
| IMAGE FORMING APPARATUS 107 | DIGITAL COPYING MACHINE | COLOR | 600 | 600 | RGB | MEDIUM | MEDIUM | MEDIUM |
| IMAGE FORMING APPARATUS 108 | DIGITAL COPYING MACHINE | COLOR | 1200 | 1200 | CMYK | LOW | LOW | HIGH |
| IMAGE FORMING APPARATUS 109 | DIGITAL COPYING MACHINE | MONOCHROME | 600 | 600 | BW | - | LOW | LOW |

REMOTE COPY SYSTEM, IMAGE FORMING APPARATUS, CONTROL METHOD THEREFOR, AND STORAGE MEDIUM

BACKGROUND OF THE INVENTION

1. Field of the Invention

The present invention relates to a remote copy system in which a plurality of image forming apparatuses are connected to each other via a network, an image forming apparatus and a control method therefor, and a storage medium storing a control program for implementing the control method.

2. Description of the Related Art

When a printer of a local copying machine is busy performing a printing operation, as a means for quick delivery of a copy, a remote copy system has been conventionally used in which an image of an original is scanned using a scanner of the local copying machine, and then a remote copying machine or printer is caused to output a copy of the image of the original. The remote copy system executes a remote copy process in which a raster (bitmap) image is transferred.

In the above remote copy system, for more efficient print output by a remote apparatus, in order to determine an optimum apparatus that performs an image forming process, Japanese Laid-Open Patent Publication (Kokai) No. 2000-209377 proposes the following technique: An optimum image processing apparatus that is capable of performing the designated image process is determined referring to respective time points at which image processing apparatuses can start image processing, image processing formats, and image processing speeds, and image transfer speeds of the apparatuses.

In the conventional remote copy system, when the resolution of the scanner of the local apparatus and the resolution of the printer of the remote apparatus are different from each other, it is required to perform resolution conversion of raster image data. This resolution conversion causes degradation of image quality.

Further, when image processing is performed so as to improve the quality of an image output by remote copy, depending on the image processing performance, such as image processing speed, of a remote apparatus selected as an output apparatus for outputting the image, there sometimes occurs a case in which the productivity of the remote copy is markedly degraded.

SUMMARY OF THE INVENTION

The present invention provides a remote copy system, an image forming apparatus, and a control method therefor, which are capable of improving the quality of an image formed by remote copy, and a storage medium storing a control program for implementing the control method.

Further, the present invention provides a remote copy system, an image forming apparatus, and a control method therefor, which are capable of making productivity higher than the prior art, when image processing is performed for improving the image quality, and a storage medium storing a control program for implementing the control method.

In a first aspect of the present invention, there is provided an remote copy system including a plurality of image forming apparatuses connected to a network, in which an image forming apparatus that reads an original is defined as a local apparatus, and an image forming apparatus that performs image formation is defined as a remote apparatus, the remote copy system executing remote copy in which the remote apparatus performs image formation based on an image of the original read by the local apparatus, comprising an input unit configured to accept an input of settings for executing the remote copy, a process determination unit configured to determine an image process to be executed, based on the settings accepted by the input unit, a processing apparatus determination unit configured to determine an image forming apparatus that is to execute the image process determined by the process determination unit, based on performance of each image forming apparatus, and an execution unit configured to execute the remote copy by causing the image forming apparatus determined by the processing apparatus determination unit to perform the image process determined by the process determination unit on data of the image of the original read by the local apparatus, and causing the remote apparatus to perform image formation based on the data of the image subjected to the image process.

The remote copy system according to the first aspect of the present invention an input unit configured to accept an input of settings for executing the remote copy, and a process determination unit configured to determine an image process to be executed, based on the settings accepted by the input unit. Further, the remote copy system includes a processing apparatus determination unit configured to determine an image forming apparatus that is to execute the image process determined by the process determination unit, based on performance of each image forming apparatus. The remote copy system also includes an execution unit configured to execute the remote copy by causing the image forming apparatus determined by the processing apparatus determination unit to perform the image process determined by the process determination unit on data of the image of the original read by the local apparatus.

With this configuration of the remote copy system, irrespective of the resolution of the scanner of the local apparatus and that of the remote apparatus, it is possible to obtain a high-quality remote copy output. Further, it is possible to make productivity higher than the prior art, when remote copy involving image processing for improving the image quality is executed.

The image process determined by the process determination unit can be at least one of a vectorization process, a color space conversion process, and a resolution conversion process.

The input unit is capable of accepting an input for designation to select one color mode from a plurality of color modes.

The processing apparatus determination unit is further capable of determining the remote apparatus for remote copy, and the input unit is further capable of accepting an input for designation to select the local apparatus as an output apparatus of the remote copy, the processing apparatus determination unit determining the local apparatus as the remote apparatus of the remote copy when the input unit accepts the input for designation to select the local apparatus as the output apparatus of the remote copy.

The input unit can accept an input for designating one resolution selected from a plurality of resolutions.

The input unit is further capable of accepting an input for designation to perform a higher image-quality output than the local apparatus.

When the input unit accepts the input for designation to perform a higher image-quality output than the local apparatus, the process determination unit can determine that the image process to be executed is a vectorization process.

The remote copy system further comprises an information acquisition unit configured to obtain at least one of an operating state, a physical location, a vectorization speed, a rendering speed, a color space, a color processing speed, a resolution, and a resolution processing speed, and wherein the processing apparatus determination unit identifies performance of the image forming apparatus based on the information acquired by the information acquisition unit, and determines the image forming apparatus that is to perform the image process determined by the process determination unit, based on the identified performance.

The processing apparatus determination unit can determine the image forming apparatus that is to perform the image process determined by the process determination unit, based on a data transfer time period over which the data of the image is transferred to the image forming apparatus via the network.

The processing apparatus determination unit is capable of determining at least one candidate for the remote apparatus, and includes a candidate display unit for displaying apparatus information on the image forming apparatus as the candidate for the remote apparatus.

The apparatus information displayed on the candidate display unit includes information on a physical location of the image formatting apparatus.

In a second aspect of the present invention, there is provided an image forming apparatus as one component element of a remote copy system including a plurality of image forming apparatuses connected to a network, in which an image forming apparatus that reads an original is defined as a local apparatus, and an image forming apparatus that performs image formation is defined as a remote apparatus, the remote copy system executing remote copy in which the remote apparatus performs image formation based on an image of the original read by the local apparatus, comprising an input unit configured to accept an input of settings for executing the remote copy, a process determination unit configured to determine an image process to be executed, based on the settings accepted by the input unit, a processing apparatus determination unit configured to determine an image forming apparatus that is to execute the image process determined by the process determination unit, based on performance of each image forming apparatus, and an execution unit configured to execute the remote copy by causing the image forming apparatus determined by the processing apparatus determination unit to perform the image process determined by the process determination unit on data of the image of the original read by the local apparatus, and causing the remote apparatus to perform image formation based on the data of the image subjected to the image process.

In a third aspect of the present invention, there is provided a method of controlling an image forming apparatus as one component element of a remote copy system including a plurality of image forming apparatuses connected to a network, in which an image forming apparatus that reads an original is defined as a local apparatus, and an image forming apparatus that performs image formation is defined as a remote apparatus, the remote copy system executing remote copy in which the remote apparatus performs image formation based on an image of the original read by the local apparatus, the method comprising an input step of accepting an input of settings for executing the remote copy, a process determination step of determining an image process to be executed, based on the settings accepted in the input step, a processing apparatus determination step of determining an image forming apparatus that is to execute the image process determined in the process determination step, based on performance of each image forming apparatus, and an execution step of executing the remote copy by causing the image forming apparatus determined in the processing apparatus determination step to perform the image process determined in the process determination step on data of the image of the original read by the local apparatus, and causing the remote apparatus to perform image formation based on the data of the image subjected to the image process.

In a fourth aspect of the present invention, there is provided a storage medium storing a control program for causing a computer to execute a method of controlling an image forming apparatus as one component element of a remote copy system including a plurality of image forming apparatuses connected to a network, in which an image forming apparatus that reads an original is defined as a local apparatus, and an image forming apparatus that performs image formation is defined as a remote apparatus, the remote copy system executing remote copy in which the remote apparatus performs image formation based on an image of the original read by the local apparatus, the control program comprising an input module for accepting an input of settings for executing the remote copy, a process determination module for determining an image process to be executed, based on the settings accepted by the input module, a processing apparatus determination module for determining an image forming apparatus that is to execute the image process determined by the process determination module, based on performance of each image forming apparatus, and an execution module for executing the process determined by the process determination module.

The features and advantages of the invention will become more apparent from the following detailed description taken in conjunction with the accompanying drawings.

BRIEF DESCRIPTION OF THE DRAWINGS

FIG. 2 is a diagram showing a table of specifications of image forming apparatuses.

DETAILED DESCRIPTION OF THE PREFERRED EMBODIMENTS

The present invention will now be described in detail with reference to the drawings showing preferred embodiments thereof.

Figure 1:
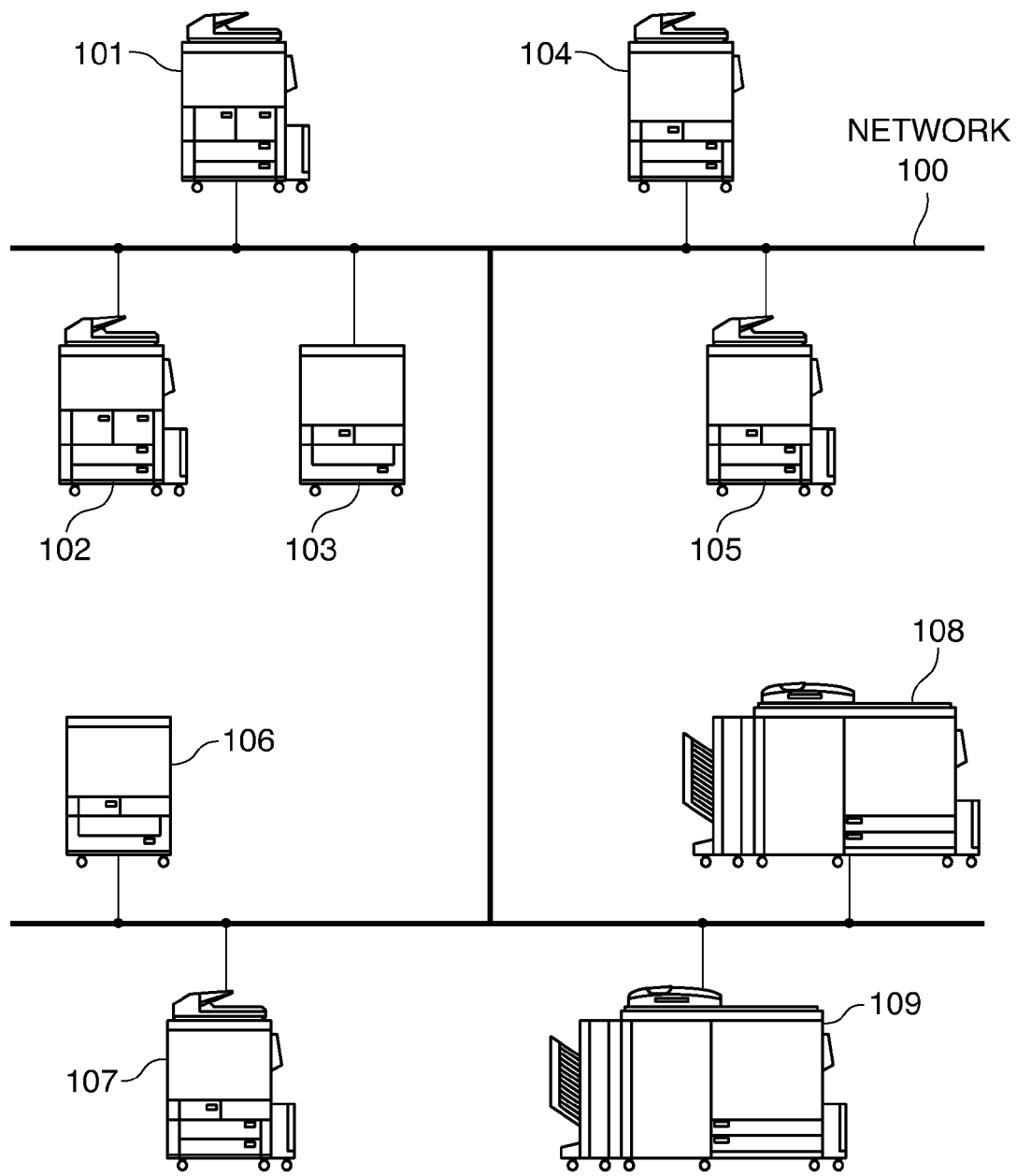
FIG. 1 is a diagram showing the whole configuration of a remote copy system according to an embodiment of the present invention.

FIG. 1 is a diagram showing the whole configuration of a remote copy system according to an embodiment of the present invention.

As shown in FIG. 1, the remote copy system according to the present invention is comprised of a plurality of image forming apparatuses 101 to 109, connected to each other via a local area network (LAN) 100.

The image forming apparatus 101 is a digital copying machine including a scanner unit 215, and a printer unit 216, both referred to hereinafter. The image forming apparatus 101 reads an image by the scanner unit 215, forms the read image into image data by the printer unit 216 to send the image data over the LAN 100, and prints image data received via the LAN 100 by the printer unit 216.

In the present embodiment, to read an image of an original using the scanner unit of an image forming apparatus included in the remote copy system to form image data, and output an image formed based on the image data by the printer unit of the same apparatus is referred to as "local copy".

On the other hand, to read an image of an original using the scanner unit of an image forming apparatus in the remote copy system to form image data, and output an image formed based on the image data by the printer unit of a different image forming apparatus in the remote copy system is referred to as "remote copy". In this case, the image forming apparatus that reads the image of the original and instructs execution of the remote copy process (i.e. the apparatus that sends the data) is referred to as the local apparatus is referred to as "the local apparatus", while an image forming apparatus other than the local apparatus, which executes data processing, is referred to as "a remote apparatus".

The remote copy system includes various types of image forming apparatuses. The image forming apparatuses 101, 102, 104, 105, 107, 108, and 109 are digital copying machines. Further, the image forming apparatuses 103 and 106 are printers without an image reading (scanner) section.

FIG. 2 is a diagram showing an example of a table showing specifications and image processing performances of the image forming apparatuses appearing in FIG. 1.

In FIG. 2, an item "color/monochrome" 112 indicates whether or not the image forming apparatus is compatible with color image data, or is compatible with only monochrome image data. An item "scanner resolution" 114 indicates the image reading (scan) resolution of the image forming apparatus provided with the image reading (scanner) section. An item "printer resolution" 116 indicates the image forming (print) resolution of the image forming apparatus.

An item "color space" (color mode) 118 indicates a type of color space which can be processed by the image forming apparatus compatible with color image data. It should be noted that the monochrome image forming apparatus is indicated by "B/W" to show that it is capable of handling only black/white image data. An item "color processing speed" 120 indicates the speed of color space conversion, such as conversion from RGB to CMYK, from RGB to a standard color space (Lab), from the standard color space to CMYK, and so forth.

An item "vectorization speed" 122 indicates the speed of vectorization of raster image data, referred to hereinafter. An item "rendering speed" 123 indicates the speed of rendering of vectorized image data, referred to hereinafter.

In the present embodiment, the color processing speed 120, the vectorization speed 122, and the rendering speed 123 are each expressed in three stages of High, Medium, and Low. Of course, they may expressed in more finely defined stages indicating respective processing speeds. Alternately, they may be expressed in specific values, e.g. time periods required in processing image data corresponding to one A4-sized page of 600 dpi.

In the present embodiment, it is assumed that each of the image forming apparatuses 101 to 109 has the same image forming speed, and the same image reading speed of the image reading unit. Of course, the remote copy system may include image forming apparatuses different in the image forming speed, in a mixed manner.

This remote copy system makes it possible to create a resolution-free and color space-free environment. The term "resolution-free" is intended to mean that even when the resolution of a local apparatus and that of an apparatus that performs image formation for output are different, it is possible, by using vectorized image data, to perform image formation with the resolution of the apparatus that performs image formation for output, without performing resolution conversion of raster image data. This makes it possible to prevent the image quality from being degraded by resolution conversion of the raster image data.

The term "color space-free" is intended to mean that when any of a plurality of image forming apparatuses of the remote copy system outputs an image, even if the output apparatus is different in color space reproduction range from the local apparatus, it can perform image formation while suppressing changes in colors to the minimum.

Next, the configuration of the image forming apparatus 101 according to the present embodiment of the present invention will be described with reference to FIG. 3.

Figure 3:
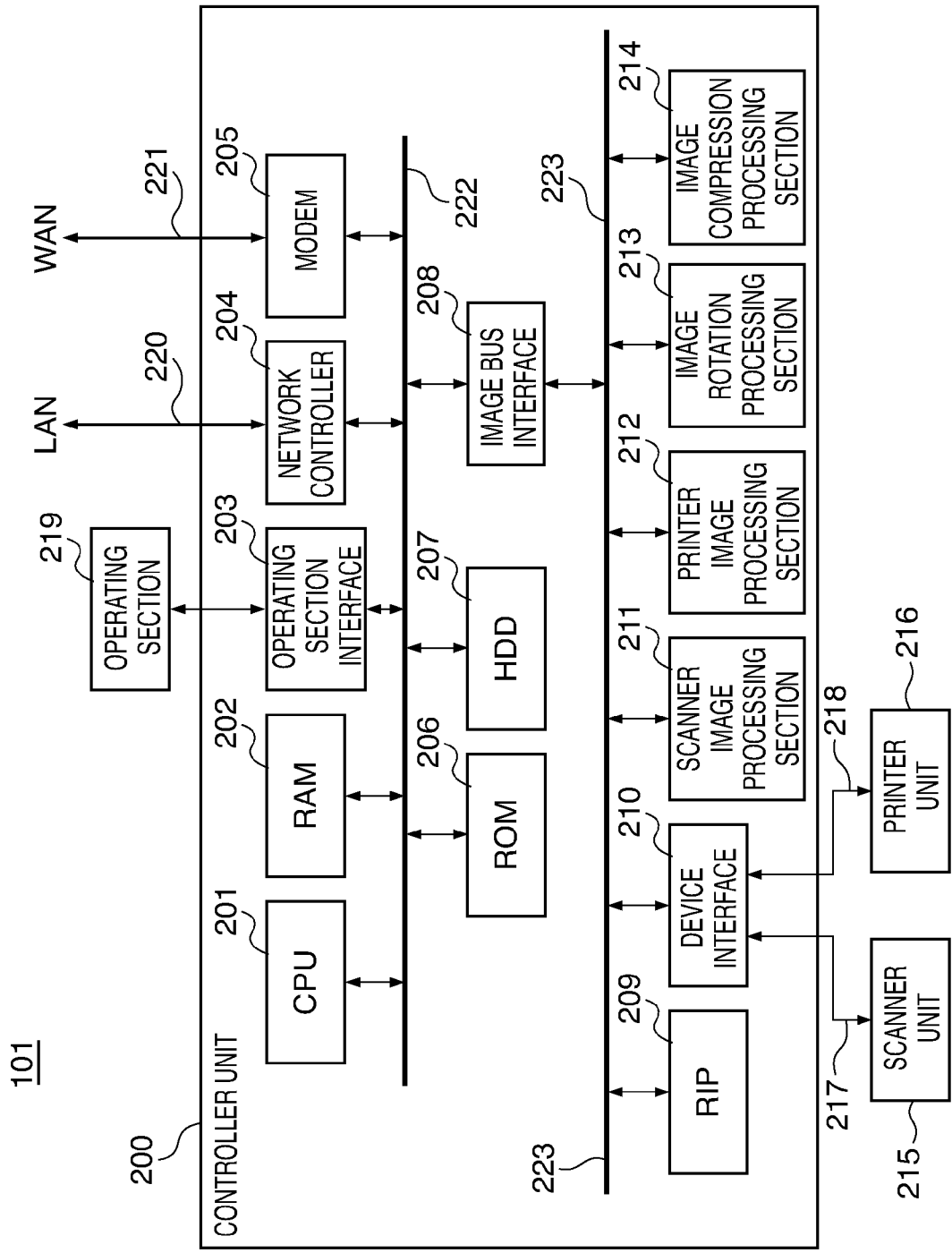
FIG. 3 is a block diagram of an image forming apparatus appearing in FIG. 1.

FIG. 3 is a block diagram of the image forming apparatus 1 in the remote copy system in FIG. 1.

Here, the other image forming apparatuses 102, 104, 105, 107, and 108 are substantially similarly configured, and hence description of the configuration of each of them is omitted. Further, the image forming apparatuses 103 and 106 as printers are also similarly configured except that they are not equipped with a part of the construction for the image reading function, and hence description of the configuration of them is also omitted.

The image forming apparatus 101 includes a controller unit 200, and a scanner unit 215 and a printer unit 216 that are connected to the controller unit 200. The controller unit 200 is connected to the LAN 100.

The controller unit 200 controls the processing, input and output of image data and apparatus information, which are performed by the local copy function, the remote copy function, the printer function for print output of data supplied from the outside via the LAN 100, and the like functions. Further, the controller unit 200 controls the overall operation of the image forming apparatus 101.

The controller unit 200 has a CPU 201. The CPU 201 starts the system based on a boot program stored in the ROM 206, and while operating along with the system, the controller unit 200 reads various kinds of control programs stored in a HDD 207, and executes predetermined processes using a RAM 202 as a work area. The HDD 207 stores the programs and image data.

Connected to the CPU 201 are not only the RAM 202, the ROM 206, and the HDD 207, but also an operating section interface 203 and a network controller 204, an image bus interface 208 via a system bus 222. Further, a modem 205 is also connected to the CPU 201 via the system bus 222.

The network controller 204 and the LAN 100 are connected to each other via a cable 220. Further, the modem 205 is connected to a WAN via a cable 205.

The operating section interface 203 provides interface with an operating section 219, and transfers image data to be displayed on the operating section 219 thereto, and a signal generated by an inputting operation via the operating section 219 to the CPU 201.

The operating section 219 includes a display section for displaying current settings of functions concerning image formation, and information input screens for inputting configuration information on the functions, and an input section including keys for inputting the configuration information on the functions. The network controller 204 is connected to the LAN 100, and provides interface for receiving and transmitting information via the LAN 100.

The image bus interface 208 is a bus bridge which connects between a image bus 223 and the system bus 222, and coverts the data structure of data transferred therebetween.

Connected to the image bus 223 are an RIP (raster image processor) 209, a device interface 210, a scanner image processing section 211, a printer image processing section 212, an image rotation processing section 213, and an image compression processing section 214. The RIP 209 forms PDL (Page Description Language) code and vectorized data, referred to hereinafter, into a bitmap image.

The device interface 210 connects the scanner unit 215 as an image input device and the printer unit 216 as an image output device to the controller unit 200. Here, the device interface 210 and the scanner unit 215 are connected to each other via a cable 217, and the device interface 210 and the printer unit 216 are connected to each other via a cable 218.

The scanner image processing section 211 corrects, processes, and edits input image data. The printer image processing section 212 performs correction and resolution conversion of image data to be output by the printer. The image rotation processing section 213 performs rotation processing on the image data. The image compression processing section 214 performs compression/expansion processing on multi-valued image data by JPEG (Joint Photographic ExpertS Group) or the like, and binary image data by JBEG, MMR, MH (modified Huffman) or the like.

Thus, the CPU 201 of the controller unit 200 controls accesses to the various devices connected to the system bus 222 based on the control programs in a centralized fashion. Further, for example, along with the control, the controller unit 200 reads image information from the scanner unit 215, and subjects the read information to a predetermined process. Thereafter, the controller unit 200 causes the processed image information to be output to the printer unit 216 via the device interface 210.

Figure 4:
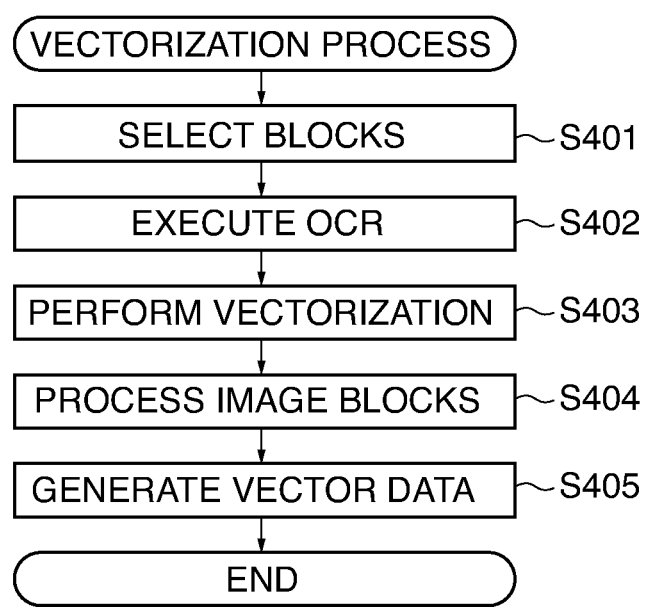
FIG. 4 is a flowchart showing a vectorization process executed by an image forming apparatus shown in FIG. 1.

FIG. 4 is a flowchart showing a vectorization process executed by an image forming apparatus shown in FIG. 2.

This process is executed by the CPU 201 of the controller unit 200 appearing in FIG. 2. The vectorization process converts bitmap image data (raster data) of a scanned image or the like into vectorized data in a format called DAOF (Document Analysis Output Format). The DAOF data is resolution-free data.

Referring to FIG. 4, in a step S401, a block selection process is performed on bitmap image data which is instructed to be vectorized.

The block selection process analyzes the input raster image data and divides the image data into blocks including respective objects contained in the image, and determines attributes of an image of each block to thereby classify the blocks. In the present embodiment, the attributes include characters (text), an image (photo), a line, a figure (picture), and a table. Of course, there may be included other attributes indicative of other types of images.

Figure 5:
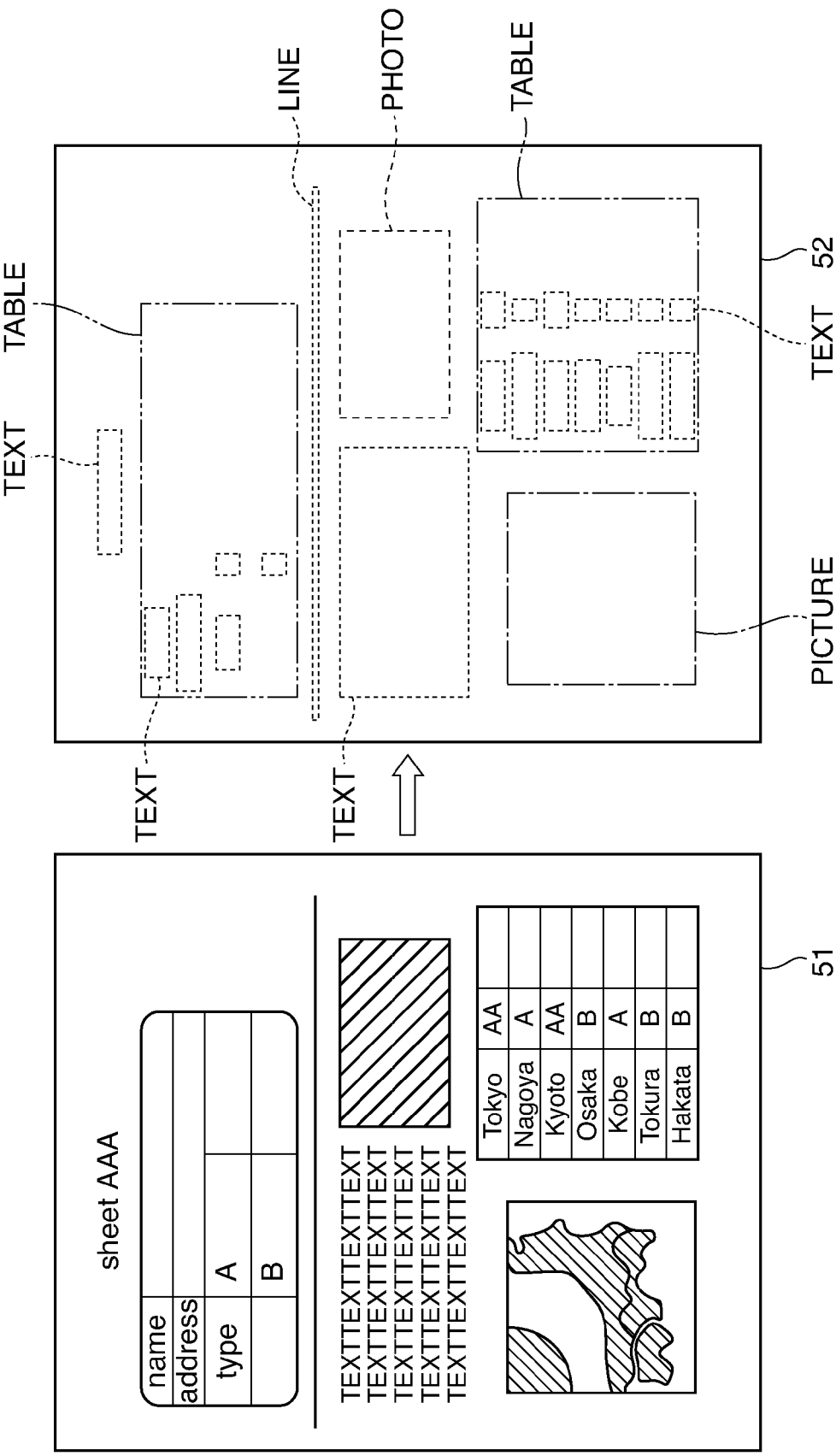
FIG. 5 is a diagram showing an example of a block selection process executed in the vectorization process in FIG. 4.

FIG. 5 is a diagram showing an example of a block selection process executed in the FIG. 4 vectorization process.

In FIG. 5, a determination result 52 shows a result of the block selection process performed on the input image 51. In the determination result 52, each of portions surrounded by dotted lines represents a unit of object block as the result of analysis of an image image. The type of an attribute attached to each object is the result of the determination by the block selection process.

Referring again to FIG. 4, in respective steps S402 to S405, processes required for vectorization are carried out on the blocks obtained by the division or selection in the step S401. The blocks determined to be of text is subjected to an OCR (character recognition) process (step S402).

Then, the vectorization process in which the size, style, typeface, etc. of each character of each text block subjected to the OCR process are recognized, and converted into font data visually faithful to the corresponding character in the input image (step S403).

Further, in a step S403, the vectorization process is performed also on each of line blocks, picture blocks, and table blocks by forming the them into outlines. On the other hand, image processing is performed on image blocks by forming image data into separate JPEG files (step S404).

In a step S405, information on the attributes and position of each block processed in the step S401, the OCR information, font information, vector information and image information obtained in the steps S402 to S404 are combined into the document analysis output format (DAOF), followed by terminating the present process.

Figure 6:
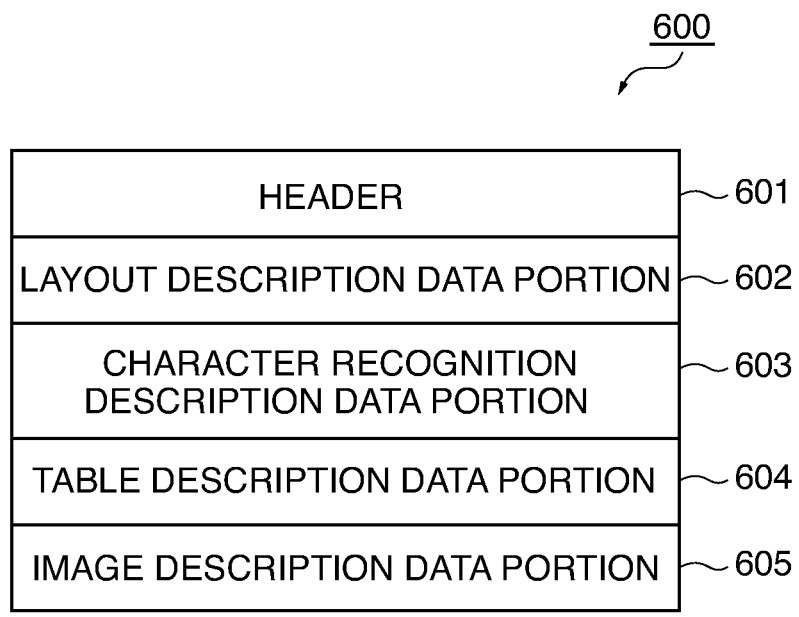
FIG. 6 is a diagram showing a data structure of DAOF (Document Analysis Output Format) used in a step S405 in the FIG. 4 process.

FIG. 6 is a diagram showing the data structure of DAOF used in the step S405 in FIG. 4.

As shown in FIG. 6, the DAOF data 600 is formed by a plurality of data portions. A header 601 holds information concerning image data to be processed. A layout description data portion 602 holds information on attribute information of each block recognized as one of text, image, line, picture, table in the input image data, and information on a rectangular address (coordinates) of the block.

A character recognition description data portion 603 holds character recognition results obtained by character recognition of text blocks. A table description data portion 604 stores details of the structure of table blocks, and an image description data portion 605 holds image (photo) data cut out from the input image data.

Figure 7:
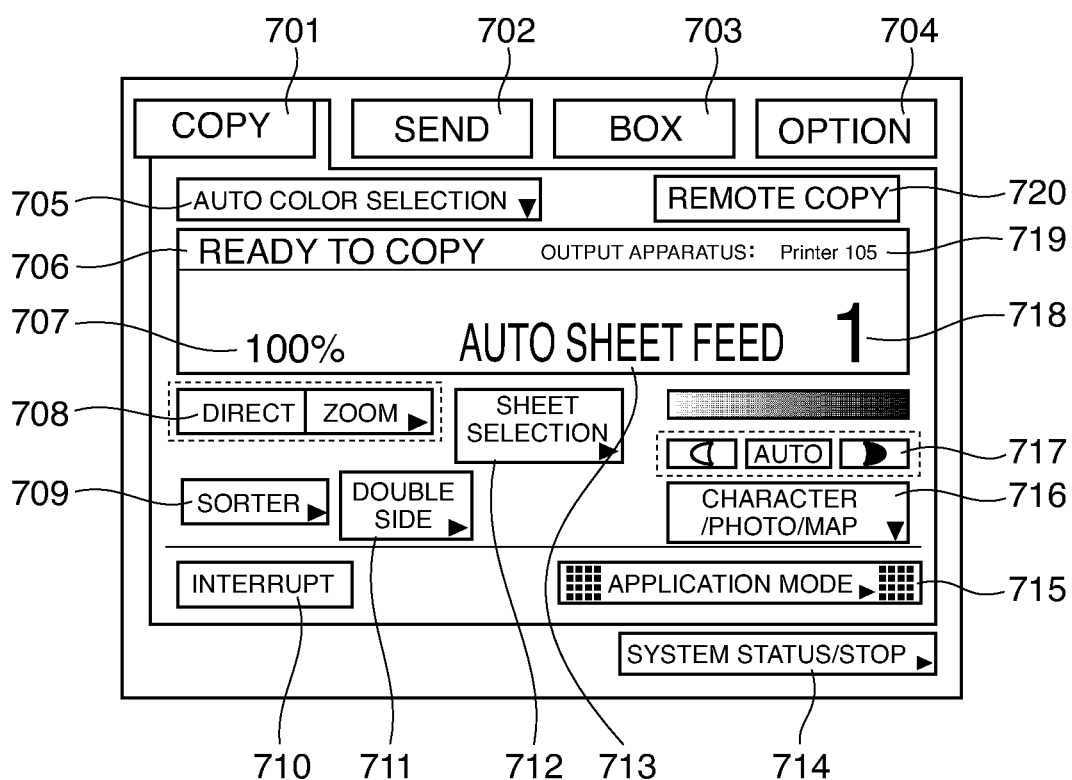
FIG. 7 is a diagram showing an example of a copy function-setting screen displayed in an operating section appearing in FIG. 3.

FIG. 7 and FIG. 8 are diagrams showing respective examples of the operating screen displayed on the operating section in FIG. 3. Other digital copying machines (image forming apparatuses) 102, 104, 105, 107, 108, and 109 are also capable of displaying similar operating screens.

FIG. 7 is a copy function-setting screen for using copy functions including local copy and remote copy.

In FIG. 7, a copy tab 701 is a tab key for causing the screen to shift to an operating screen for a copy operation, and a send tab 702 is a tab key for causing the screen to shift to an operating screen for instructing a transmission (Send) operation for transmitting a FAX and an E-mail.

A box tab 703 is a tab key for causing the screen to shift to a screen for performing an operation for inputting and outputting a job to a box (storage means for storing a job in association with each of users), and an option tab 704 is a tab key for setting an expansion function e.g. for scanner settings. A system monitor key 714 is for causing the condition or status of the MFP (image forming apparatus) to be displayed, and by selecting each tab, it is possible to shift to an operation mode corresponding thereto.

A color selection/setting key 705 is for selecting a color copy, a monochrome copy, or an automatic color selection mode, in advance, and a zoom setting key 708 is for causing the screen to shift to a screen for configuring a magnification, such as equimagnification, magnification, reduction, etc.

A post process configuration key 709 is for causing the screen to shift to a screen for configuring settings of execution or non-execution of stapling or punching, the number of portions to be stapled or punched, and the respective positions of these portions, and a double-sided printing setting key 711 for causing the screen to shift to a screen for selecting either one-sided printing or double-sided printing.

A sheet size-setting key 712 is for causing the screen to shift to a screen for setting a sheet cassette, a sheet size, and a media type, and an image mode-setting key 716 is for selecting an image mode, such as a text mode or a photograph mode, which is suitable of an image of an original. A density setting key 717 is for adjusting an output image such that the image becomes darker or lighter.

Next, a status display section 706 displays a simple display of a standby status, a warming-up status, jamming, an error, etc., and a magnification degree display section 707 displays a degree of magnification set by the zoom setting key 708.

A sheet size display section 713 displays a sheet size set by the sheet size-setting key 712, and a sheet count display section 718 displays the number of sheets set by a ten-key pad, not shown, and displays how-manieth sheet being printed during an printing operation.

An output apparatus display section 719 displays an output apparatus for copying, i.e. an apparatus that receives image data of an original read by the image forming apparatus 101, and performs image formation based thereon. If the output apparatus is the local apparatus, the output apparatus display section 719 displays the name of the local apparatus, or "local copy". The illustrated example shows that the digital copying machine 105 is the output apparatus.

A remote/local-switching key 720 is for instructing whether to execute remote copy or local copy. Further, an interrupt key 710 is used for causing another job to interrupt the present copy operation being executed so as to execute the job, and an application mode key 715 is for causing the screen to shift to a screen for carrying out various kinds of image processing, such as duplex-to-duplex copy, cover/interleaved sheet setting, reduced layout, and image shift, and configuring a layout.

Figure 8A:
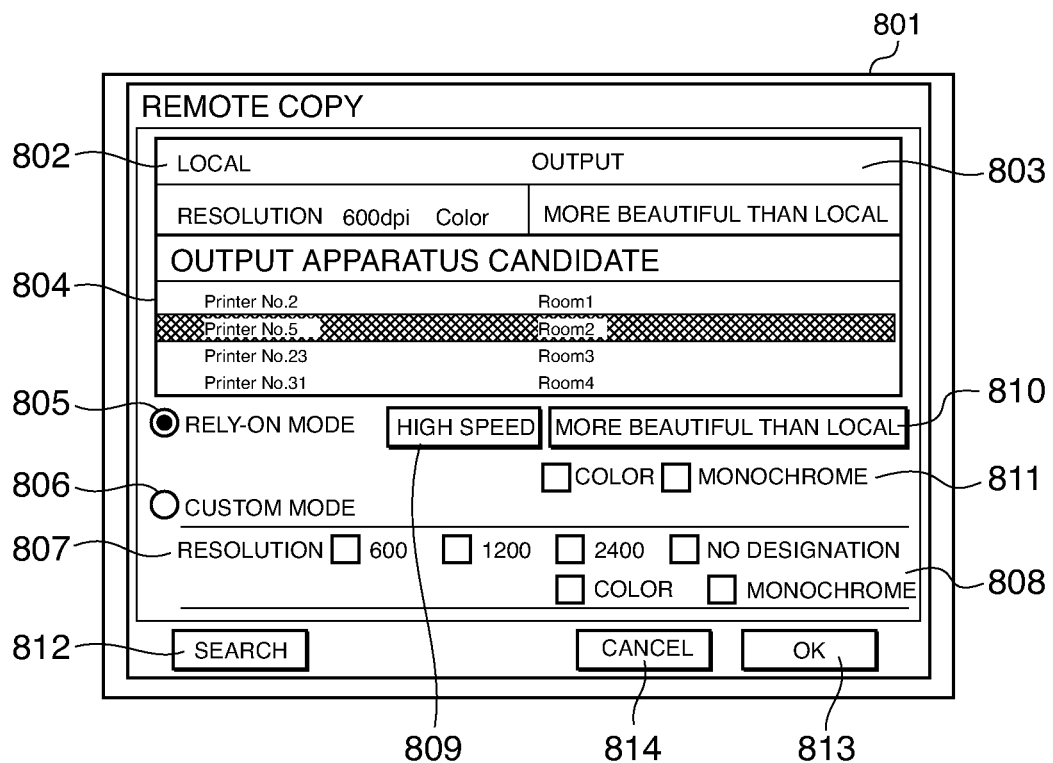
FIGS. 8A and 8B are diagrams showing examples of a remote copy-setting screen displayed in the operating section.
Figure 8B:
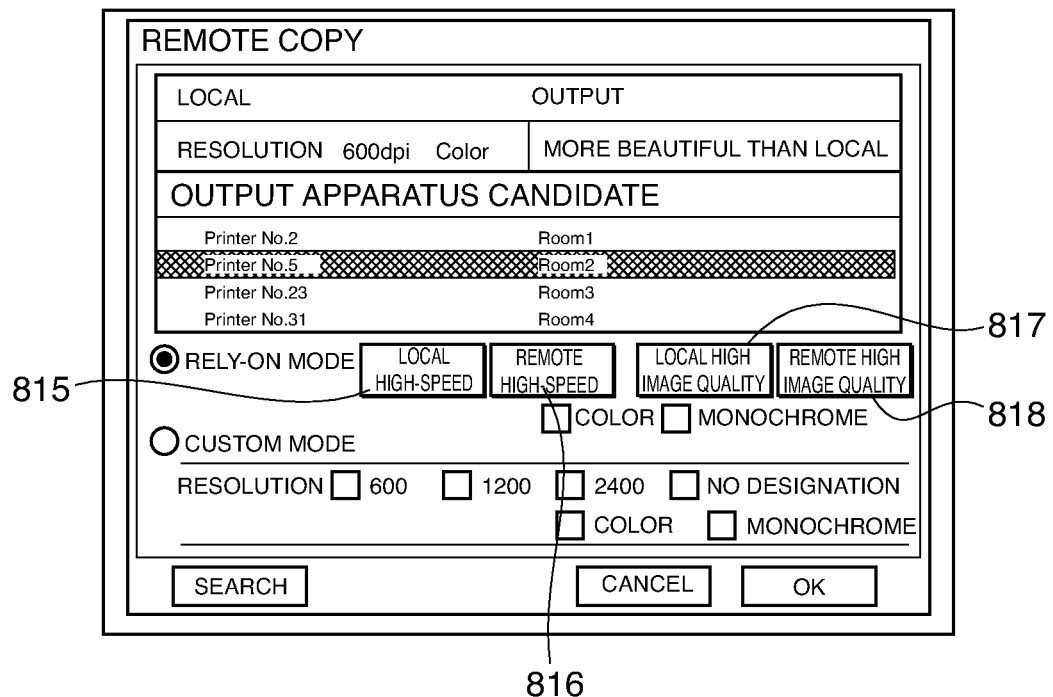

When the user operates the remote/local-switching key 720 to select remote copy, the operating section 219 displays a remote copy-setting screen 801 shown in FIGS. 8A and 8B.

Referring to FIG. 8A, a display area 802 displays information on the image forming performance of the image forming apparatus that has executed the scan, i.e. of the local apparatus. The example illustrated in FIG. 8A shows that the local apparatus outputs an image with a resolution of 600 dpi, and is capable of color mode output.

Radio buttons 805 and 806 are for accepting selection of an output mode of remote copy by the user. The radio button 805 is for selecting a "rely-on mode".

The "rely-on mode" enables remote copy to be configured by an instruction easy to understand by the user, such as "high speed" and "more beautiful than local", without instructing complicated instructions concerning the resolution and the like. In the "rely-on" mode, it is further possible to select between a "high speed" mode and a "more beautiful than local" mode, which can be selected by depressing a "high speed" key 809 and a "more beautiful than local" key 810, respectively.

When the "high speed" key 809 is depressed, remote apparatuses are selected for data processing for output are selected with preference to productivity. When the "more beautiful than local" key 810 is selected, remote apparatuses are selected which are capable of processing data and outputting a more beautiful copy than a local copy output by the local apparatus. When the "more beautiful than local" key 810 is selected, further, a color/monochrome output selection check box 811 is displayed which enables election between a color output and a monochrome output.

If no instruction for selecting the color/monochrome output selection check box 811 is input, the controller unit 200 of the local apparatus selects the same mode concerning color/monochrome as selected in the local apparatus that executed the scan of the image of the original.

A radio button 806 is for selecting a "custom mode". The custom mode enables the user to directly specify an output resolution of remote copy. When the user selects the custom mode, a resolution selection check box 807 and a color/monochrome output selection check box 808 enables designation of a color/monochrome output mode and a resolution of each remote apparatus.

The color/monochrome output selection check box 808 enables the user to select a color output mode or a monochrome output mode. If no designation is selected, the color output mode or the monochrome output mode selected for the scan by the local apparatus is automatically selected. The resolution selection check box 807 enables selection from 600 dpi, 1200 dpi, 2800 dpi, and no designation. When no designation is selected, the resolution with which the local apparatus executed the scan of the image is automatically selected.

Selection between the "rely-on mode" and the "custom mode" can be executed only in an exclusive manner.

After selecting the rely-on mode or the custom mode, and setting conditions of the selected mode, if the user depresses a search key 812, the controller unit 200 starts selection of candidates for the remote apparatuses.

In a display area 804, there is displayed a list of candidates for a remote apparatus selected by the controller unit 200 for outputting a copy (output remote apparatus), i.e. the apparatus names for specifying candidates for the output remote apparatus and information on the locations of the respective candidates for the output remote apparatus. The user selects a desired output remote apparatus from the list of the candidates, whereby the output remote apparatus selected for outputting a copy and remote apparatuses for intermediate data processing for remote copy are finally determined.

In the display, a plurality of candidates for the output remote apparatus may be displayed, or one of the candidates which the controller unit 200 judges to be most suitable may be automatically selected, and the selected output remote apparatus may be displayed on the display area 804.

A display area 803 displays details of the settings of the remote copy configured by the user. The example of FIG. 8A shows that the user has selected "more beautiful than local" of the "rely-on" mode.

When the configuration for remote copy has been thus far completed, if an OK key 813 is depressed, settings of the items configured from the remote copy-setting screen 801 are finally determined, and the screen returns to the operating screen for the copy operation displayed when the copy tab 701 is selected as in FIG. 7. Then, by depressing a copy start key, not shown, the local apparatus starts an operation of remote copy. On the other hand, if a cancel key 814 is depressed, the settings of the items configured from the remote copy-setting screen 801 are cancelled, and the screen returns to the operating screen for the copy operation displayed when the copy tab 701 is selected as in FIG. 7.

Figure 9:
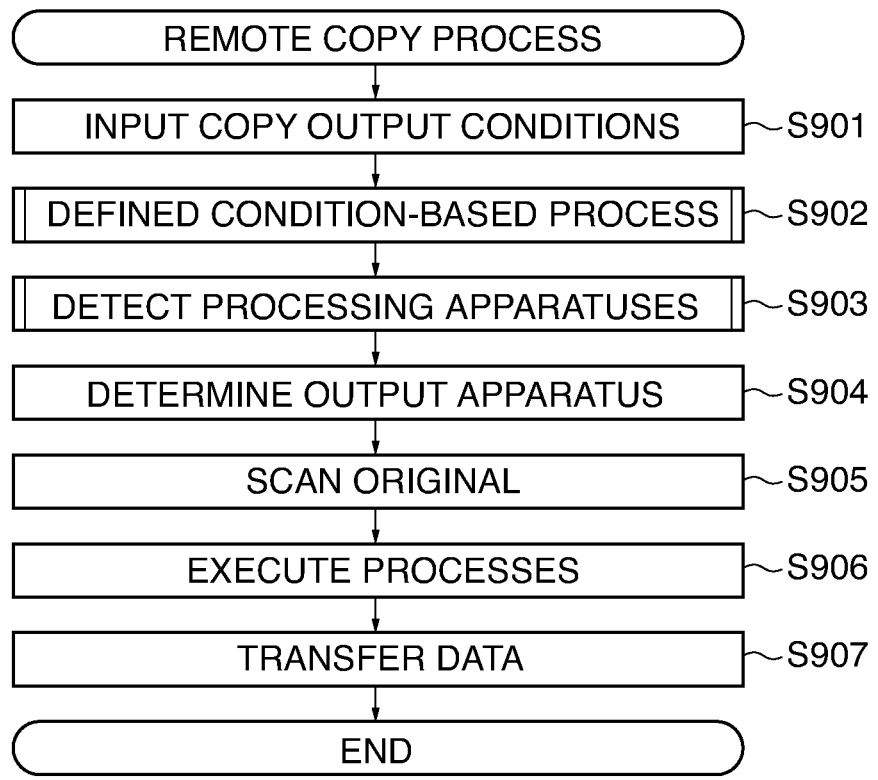
FIG. 9 is a flowchart showing a remote copy process executed by an image forming apparatus shown in FIG. 3.

FIG. 9 is a flowchart of a remote copy process executed by the image forming apparatus shown in FIG. 3.

The present process is executed by the CPU 201 of the controller unit 200 of the image forming apparatus serving as the local apparatus. More specifically, the CPU 201 reads out a program for the process stored in the ROM 206 or the HDD 207 to execute the program.

Referring to FIG. 9, first, in a step S901, inputs by the user for remote copy are accepted in the remote copy-setting screen 801 in FIG. 8A. In a step S902, from the input conditions selected in the step S901, image processes required for the remote copy are determined. Details of this process will be described in detail hereinafter.

In a step S903, image forming apparatuses for executing the image processes determined in the step S902 are determined. Then, one or a plurality of candidates for the output remote apparatus are displayed together with the physical location(s) thereof in the display area 804 of the remote copy-setting screen 801. Details of these processes will also be described hereinafter.

In a step S904, from the image forming apparatuses selected as the candidates for the output remote apparatus in the step S903, one of them is determined as the output remote apparatus according to an instruction by the user. In a step S905, an original set in the scanner unit 215 is scanned, and a scanned image thereof is taken in as an input image to the local apparatus. The input scanned image and the color information are stored in a buffer area of the RAM 202, and the process proceeds to a step S906.

In a step S906, the vectorization process, a color process, and a resolution conversion process determined in the step S902 are executed, as required, based on whether each of them is required to be executed or not required to be executed by the local apparatus. In a step S907, data converted in the step 906 and the remote copy information are sent to a remote apparatus for execution of the following process via the network controller 204, followed by terminating the present process.

Figure 10:
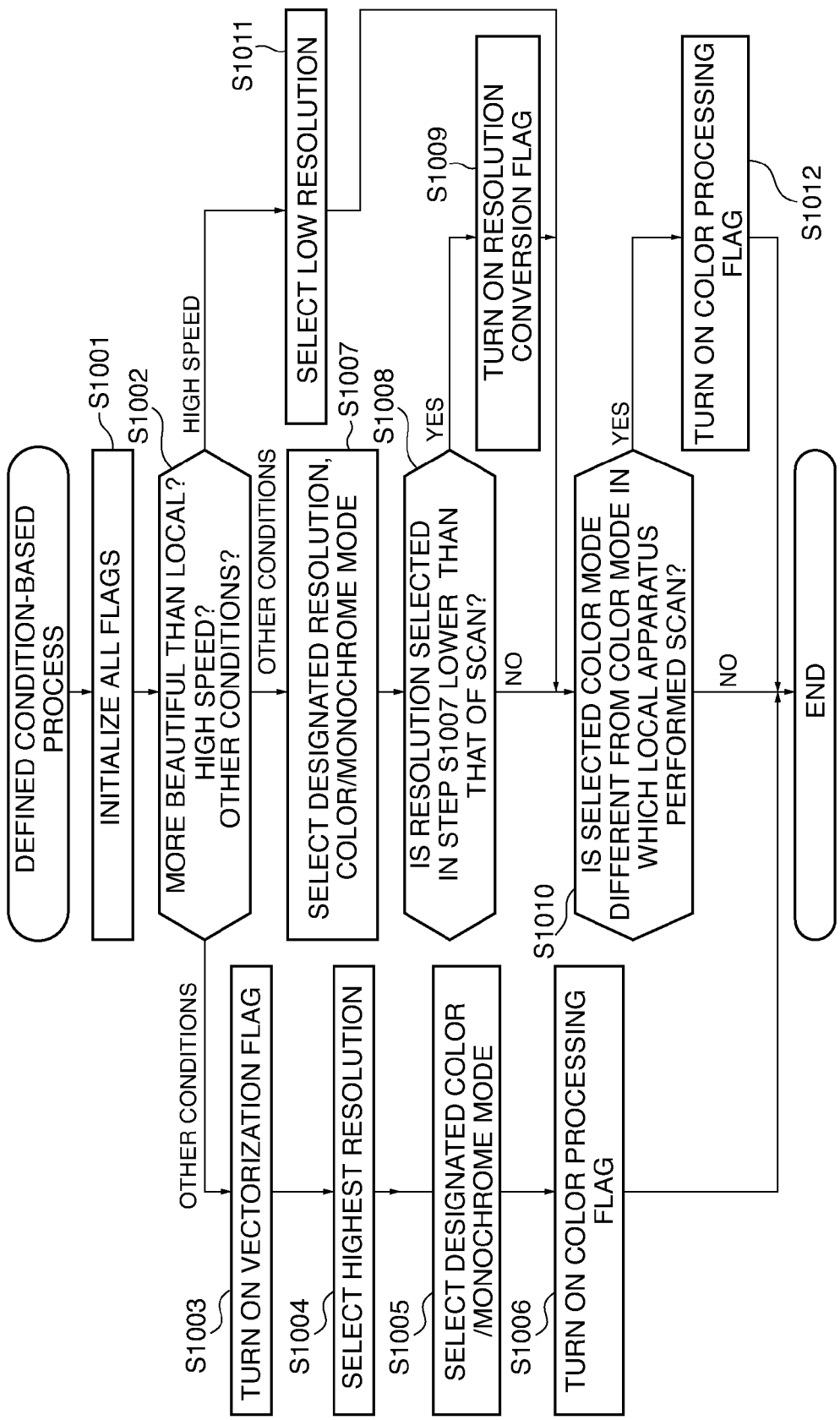
FIG. 10 is a flowchart showing a defined condition-based process executed in a step S902 in FIG. 9.

FIG. 10 is a flowchart showing a defined condition-based process executed in the step S902 in FIG. 9.

In FIG. 10, first in a step S1001, a vectorization flag, a color processing flag, a resolution conversion flag, and a rendering flag are all initialized (turned off). If any of these flags is on, it means that the image process associated with the flag is to be executed, and if it is off, it means that the image process associated with the flag is not to be executed.

In a step S1002, it is determined whether or not the output mode selected by the user from the remote copy-setting screen 801 is the "more beautiful than local" or "high speed" of the rely-on mode, or the custom mode.

If "more beautiful than local" is selected, the process proceeds to a step S1003, whereas if the custom mode is selected, the process proceeds to a step S1007. If "high speed" mode is selected, the process proceeds to a step S1011.

In the step S1011, a low resolution is selected as the scan resolution of the scanner unit 215, and the process proceeds to a step S1010. In the step S1003, the vectorization flag is turned on and the process proceeds to a step S1004. In the step S1004, a highest resolution with which the scanner unit 215 of the image forming apparatus can operate is set to the scan resolution, and the program proceeds to a step S1005. If the image forming apparatus 101 is a local apparatus, the highest resolution of 600 dpi of the scanner unit 215 of the image forming apparatus 101 is set, as can be understood by referring to FIG. 2.

In the step S1005, an output mode which is designated by the color/monochrome output selection check box 811 in the remote copy-setting screen 801 is selected, and the process proceeds to a step S1006.

In the step S1006, the color processing flag indicative of execution of a color space conversion process is turned on, followed by terminating the process. It should be noted that if the monochrome output is selected in the step S1005, the process is terminated without turning on the color processing flag.

If "other conditions" is selected in the step S1002, the process proceeds to a step S1007. The selection of "other conditions" corresponds e.g. to a case where the custom mode is selected by the radio button 806 (see FIG. 8).

In a step S1007, the resolution and color/monochrome output mode designated by the user in the resolution selection check box 807 and the color/monochrome output selection check box 808 in the remote copy-setting screen 801, respectively, are selected.

If neither of the check boxes of the color/monochrome output selection check box 808 are checked, the color or monochrome output mode (referred to as the color mode) in which the local apparatus scanned the original image is selected. Further, when no designation is selected in the resolution selection check box 807, or none of the check boxes of the resolution selection check box 807 are selected, the same resolution with which the local apparatus scanned the original is selected, and then the program proceeds to a step S1008.

In the step S1008, it is determined whether or not the resolution selected in the step S1007 is lower than the resolution of the scanned image. If it is determined that the resolution selected in the step S1007 is equal to or higher than the resolution with which the scan was executed, the process directly proceeds to a step S1010. On the other hand, if it is determined that the resolution selected in the step S1007 is lower than the resolution with which the scan was executed, the process proceeds to a step S1009, wherein the resolution conversion flag is turned on, and the process proceeds to the step S1010.

In the step S1010, it is determined whether or not the color mode selected in the step S1007 is different from the color mode in which the local apparatus performed the scan. If it is determined that the selected color mode is different, the process proceeds to a step S1012, wherein the color processing flag is turned on. On the other hand, if it is determined that the selected color mode is not different, the present process is immediately terminated.

Figure 11:
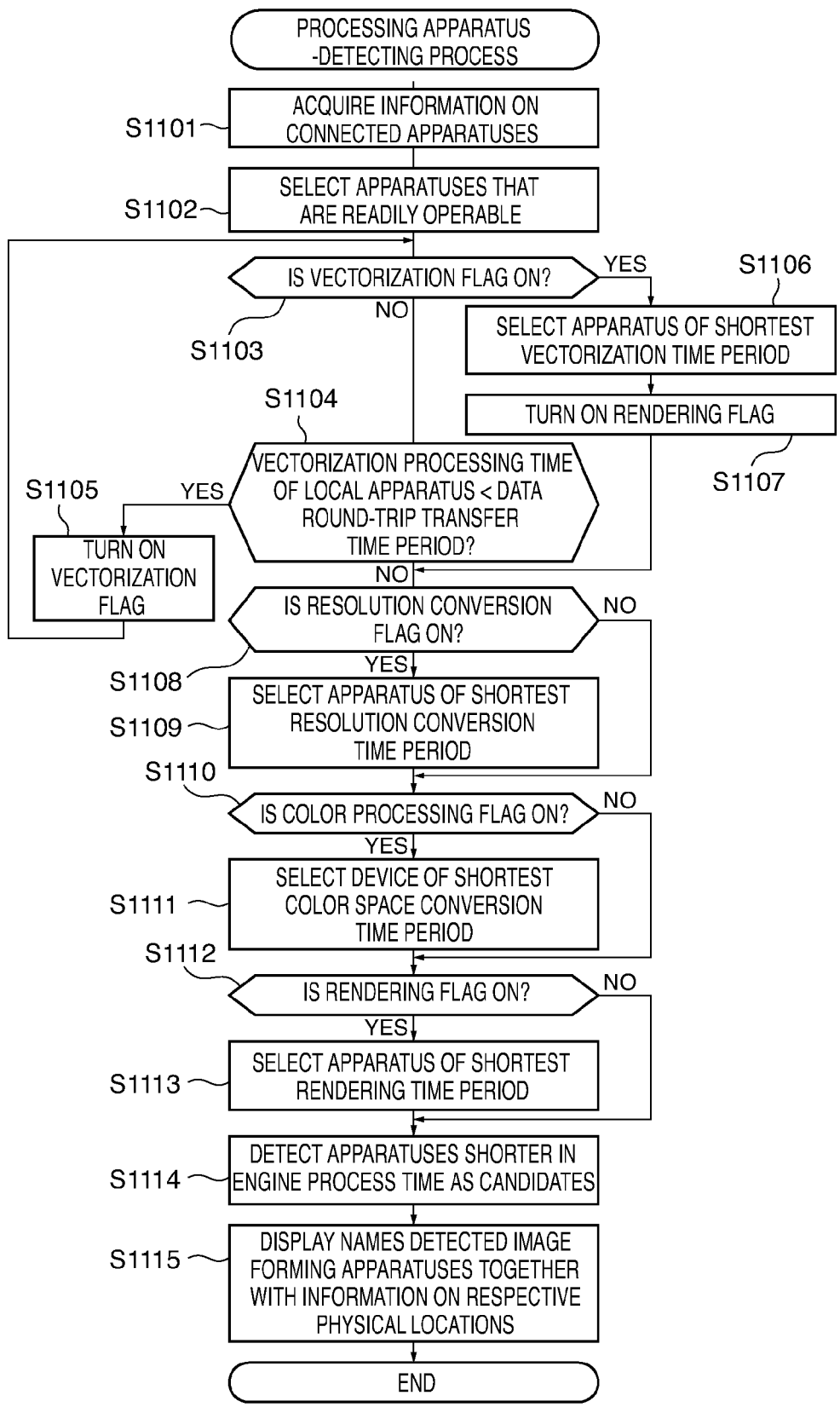
FIG. 11 is a flowchart showing a processing machine-detecting process executed in a step S903 in FIG. 9.

FIG. 11 is a flowchart of a processing apparatus-detecting process executed in the step S903 in FIG. 9.

This process determines image forming apparatuses that are caused to execute image processes respective flags for which have been turned on, and an image forming apparatus that serves as the output remote apparatus for remote copy.

Referring to FIG. 11, first, in a step S1101, performance information on each image forming apparatus that is connected to the LAN 100 is obtained. The performance information to be obtained includes the operating state, physical location, vectorization performance, color conversion performance, resolution conversion performance, and rendering performance of the image forming apparatus, and an output processing performance indicative of the printing speed of the image forming apparatus.

Each of the vectorization performance, the color conversion performance, the resolution conversion performance, and the rendering performance includes information on a time period it takes to complete the process on a predetermined reference image which is e.g. A4-sized, i.e. information on a processing speed of the process. Then, the present process proceeds to a step S1102.

In the step S1102, from the operating state of each image forming apparatus acquired in the step S1101, only image forming apparatuses which can readily execute operations for remote copy are selected as candidates for the remote apparatuses, i.e. remote apparatus candidates are detected. For example, image forming apparatuses which are idling are selected while excluding image forming apparatuses that are currently executing image forming operations or those that hold lots of jobs waiting to be executed.

In a step S1103, it is determined whether or no the vectorization flag is on, i.e. whether or not it is determined in the step S902 in FIG. 9 (the defined condition-based process in FIG. 10) that the vectorization process is to be executed. If it is determined that the vectorization flag is on, the process proceeds to a step S1106. If it is determined that the vectorization flag is off, the process proceeds to a step S1104.

In a step S1106, first, a time period (vectorization time period) it takes for the local apparatus to complete vectorization is determined. Then, based on the performance information of each image forming apparatus acquired in the step S1101, a time period (data round-trip transfer time period) is calculated which it takes for image data of an original sent from the local apparatus to reach the image forming apparatus, and then return to the local apparatus. Further, at the same time, a total time period of the vectorization time period of each image forming apparatus and the data round-trip transfer time period calculated for the same is calculated.

Then, an image forming apparatus indicating the shortest one of the vectorization time period of the local apparatus and the total time periods calculated for the respective image forming apparatuses is determined as the apparatus which is to perform the vectorization process. If it takes the shortest time for the local apparatus to perform the vectorization process, the local apparatus is determined as the apparatus which is to perform the vectorization process.

In the step S1107, the rendering flag is turned on.

In the step S1104, the vectorization time period of the local apparatus (the image forming apparatus 101 in the illustrated example) and the data round-trip transfer time period between the local apparatus and each image forming apparatus depending on the connecting conditions of the LAN 100 to which the image forming apparatus 101 is connected are compared with each other. The vectorization time period used at this time is part of the information acquired in the step S1101.

If it is determined that the vectorization time period of the local apparatus is shorter than the data round-trip transfer time period between the local apparatus and each apparatus candidate for execution of any of the following processes, the process proceeds to a step S1105, wherein the vectorization flag is turned on, and then the process returns to the step S1103. If it is determined that the data round-trip transfer time period is shorter, the process proceeds to a step S1108.

In the step S1108, it is determined whether or not the resolution conversion is to be performed on the image data. In the case of the resolution conversion flag being on, the process proceeds to a step S1109. If the resolution conversion flag is off, the process directly proceeds to a step S1110.

In the step S1109, a resolution conversion time period it takes for the local apparatus to complete the resolution conversion is compared with the total of the resolution conversion time period of each of the remote apparatus candidates detected in the step S1102 and the data round-trip transfer time period it takes for the data go and return once between the local apparatus and the remote apparatus candidate. The resolution conversion time period used at this time is part of the information acquired in the step S1101.

As a result of the comparison, if an image forming apparatus is detected of which the total time period of the resolution conversion time period and the data round-trip transfer time period for the data to go and return once between the local apparatus and the remote apparatus candidate is shorter than the resolution conversion time period of the local apparatus, it is determined that the resolution conversion process is to be executed by the detected apparatus.

On the other hand, if the resolution conversion time period of the local apparatus is shorter, the local apparatus is determined to execute the resolution conversion process as well.

In the step S1110, it is determined whether or not the color processing flag is on, i.e. whether or not it is determined in the step S902 in FIG. 9 (the defined condition-based process in FIG. 10) that the color space conversion process is to be executed. If the color processing flag is on, the process proceeds to a step S1111, whereas if the color processing flag is off, the process proceeds to a step S1112.

In the step S1111, the color space conversion time period it takes for the local apparatus to complete the color space conversion process is compared with the total time period of the color space conversion time period it takes for each remote apparatus candidate detected in the step S1102 to complete the color space conversion process and a data round-trip transfer time period it takes for the data to go and return once between the local apparatus and the remote apparatus candidate.

The color space conversion time used at this time is part of the information acquired in the step S1101. If the comparison between the color space conversion time period of the local apparatus and the total of a color space conversion time period it takes for each remote apparatus candidate detected in the step S1102 to complete the color space conversion process and a time period it takes for the data to go and return once between the local apparatus and the detected remote apparatus candidate shows that the color space conversion time period of the local apparatus is shorter, the local apparatus is selected, whereas if the total of the color space conversion time period of the remote apparatus candidate and the data round-trip data transfer time between the local apparatus and the remote apparatus candidate is shorter, this remote apparatus candidate is determined to execute the color space conversion process.

In a step S1112, it is determined whether or not rendering is to be performed. If the rendering flag is on, the process proceeds to a step S1113, whereas if the rendering flag is off, the process proceeds to a step S1114.

In the step S1113, the time period it takes for the local apparatus to complete rendering is compared with the total of a time period it takes for each of the remote apparatus candidates detected in the step S1102 to perform rendering and a data round-trip transfer time period it takes for the data to go and return once between the local apparatus and the remote apparatus candidate. As the rendering time, there is used part of the information acquired in the step S1101.

If the rendering time period of the local apparatus is shorter than the total of the rendering time period of the remote apparatus candidate and the data round-trip transfer time period between the local apparatus and the remote apparatus candidate, the local apparatus is determined to be the image forming apparatus that is to execute rendering, whereas if the total of the rendering time period of the remote apparatus candidate and the data round-trip transfer time period is shorter, this apparatus is determined to be the image forming apparatus that is to execute rendering.

In a step S1114, respective totals of engine process time periods of the remote apparatus candidates detected in the step S1102 and capable of performing output in the color/monochrome output mode set in the step S1007 or S1002 and round-trip data transfer time periods between the local apparatus and the respective remote apparatus candidates are compared with each other. As the engine process time, there is used part of the information acquired in the step S1101. As a result of the comparison, a plurality of image forming apparatuses which are shortest in processing time including the engine process time and the data round-trip transfer time period are determined to be output remote apparatus candidates.

In a step S1115, the names and information on physical locations of the output remote apparatus candidates determined in the step S1114 are displayed in the display area 804 of the operating section 219 of the image forming apparatus 101.

Figure 12:
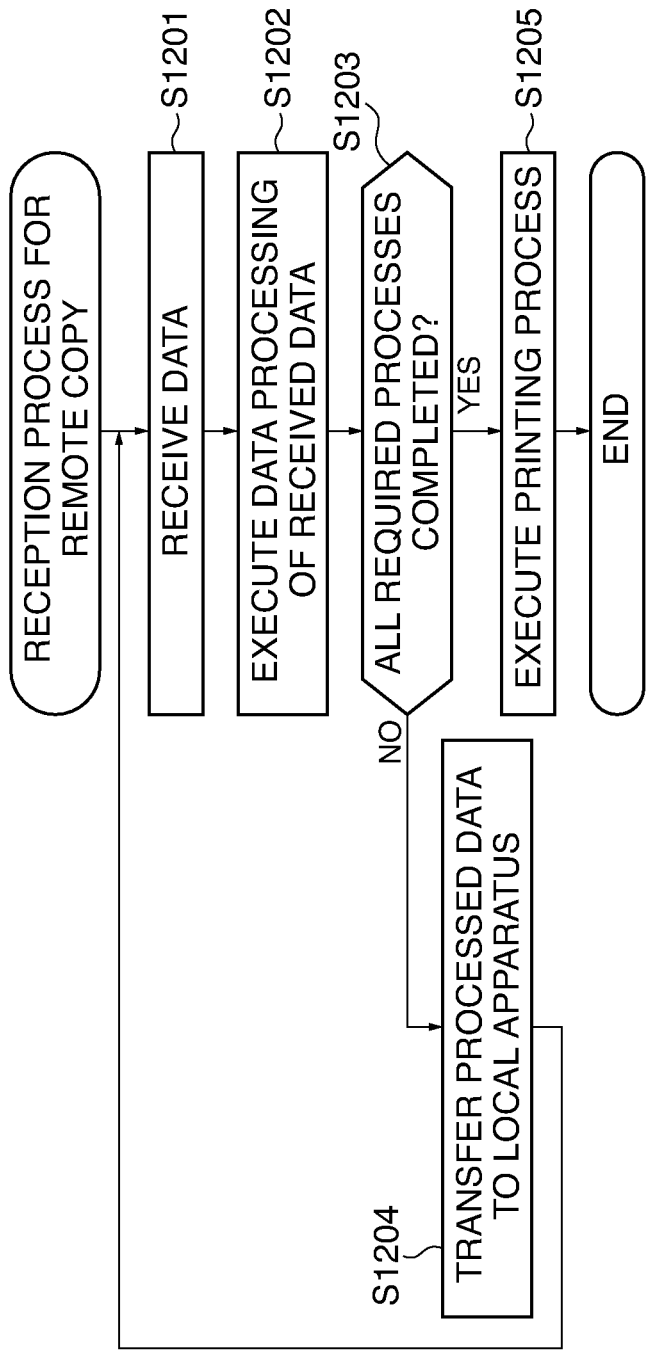
FIG. 12 is a flowchart showing a reception process for remote copy, which is executed by an image forming apparatus appearing in FIG. 1.

FIG. 12 is a flowchart of a reception process for remote copy, which is executed by an image forming apparatus appearing in FIG. 1.

Hereinafter, referring to FIG. 12, a description will be given of the reception process for remote copy, which is executed by a remote apparatus other than the local apparatus during execution of remote copy. The present process is executed by the CPU 201 of the controller unit 200 of the remote apparatus or by any associated unit of the controller unit 200 under the control of the CPU 201.

Now, similarly to the preceding description, an apparatus that instructs execution of the remote copy process (i.e. the apparatus that sends the data) is referred to as the local apparatus, and other apparatuses than the local apparatus that executes data processing for remote copy are each referred to as a remote apparatus. Upon reception of data and remote copy information from an apparatus that has been executing a process for remote copy, a remote apparatus starts the designated following process of data processing.

In the reception process for remote copy, the remote apparatus under job control receives data and remote copy information from the local apparatus or a remote apparatus having executed the preceding process in a step S1201, and then the process proceeds to a step S1202.

In a step S1202, data processing of the received data is executed based on the remote copy information received in the step S1201.

In a step S1203, it is determined whether or not the all the processes for data processing required in remote copy expect copy output (printing) have been completed. If all the processes have not been completed, the process proceeds to a step S1204, wherein the processed data is transferred to the local apparatus. If all the processes have been completed, the process proceeds to a step S1205, wherein the printing process is executed, followed by terminating the present process.

Next, a description will be given of an example of selecting the processes to be executed up to the print output and image forming apparatuses therefor, and outputting a print under output conditions meeting the purpose.

Referring to FIG. 8B, when the radio button 805 is depressed to select the rely-on mode, a local high-speed key 815, a remote high-speed key 816, a local high image quality key 817, and a remote high image quality key 818 becomes selectable.

The local high-speed key 815 being selects the local apparatus for the output apparatus, but selects the processes up to the output process which can output at highest speed and the image forming apparatuses for performing these processes. The remote high-speed key 816 has the same function as the high-speed key 809, but is distinguished therefrom in selecting a remote apparatus that can output a print at high speed.

The local high image quality key 817 selects a local apparatus for the output apparatus, and selects the processes and apparatuses optimum for a high quality output. The remote high quality image key 818 has the same function as the "more beautiful than local" key 810, but is distinguished therefrom in selecting a remote apparatus that can output a print with higher image quality than a print output by local copy.

Assuming that local high-speed or local high-quality has been selected by the associated key 815 or 817, in the processing apparatus-detecting process in FIG. 11, processes in the steps S1114 and S1115 are not executed, but the local apparatus is set as the output apparatus. On the other hand, assuming that remote high-speed or remote high-quality has been selected by the associated key 816 or 818, the processes in the steps S1114 and S1115 are executed.

It is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-029492 filed Feb. 8, 2007, which is hereby incorporated by reference herein in its entirety.

What is claimed is:

1. A remote copy system including a plurality of image forming apparatuses connected to a network, from among which an image forming apparatus that reads an original is defined as a local apparatus and an image forming apparatus that performs image formation is defined as a remote apparatus, the remote copy system executing a remote copy in which the remote apparatus performs image formation based on an image of the original read by the local apparatus, the remote copy system comprising:

an input unit configured to accept an input of settings for executing the remote copy;

a process determination unit configured to determine an image process to be executed, based on the settings accepted by said input unit;

a processing apparatus determination unit configured to determine an image forming apparatus, from among the plurality of image forming apparatuses, that is to execute the image process determined by said process determination unit, based on information representing performance of each image forming apparatus;

a remote apparatus determination unit configured to determine the remote apparatus, from among the plurality of image forming apparatuses based on the settings accepted by said input unit; and an execution unit configured to execute the remote copy by causing the image forming apparatus determined by said processing apparatus determination unit to perform the image process determined by said process determination unit on data of the image of the original read by the local apparatus, and causing the remote apparatus to perform image formation based on the data of the image subjected to the image process.

2. A remote copy system as claimed in claim 1, wherein the image process determined by said process determination unit is at least one of a vectorization process, a color space conversion process, or a resolution conversion process.

3. A remote copy system as claimed in claim 1, wherein said input unit is configured to accept an input for selecting one color mode from a plurality of color modes.

4. A remote copy system as claimed in claim 1, wherein:
said input unit is further configured to accept an input for selecting the local apparatus as an output apparatus of the remote copy, and
said remote apparatus determination unit is configured to determine the local apparatus as the remote apparatus of the remote copy when said input unit accepts the input for selecting the local apparatus as the output apparatus of the remote copy.

5. A remote copy system as claimed in claim 1, wherein said input unit accepts an input for designating one resolution selected from a plurality of resolutions.

6. A remote copy system as claimed in claim 1, wherein said input unit is configured to accept an input for designating a higher image-quality output than the local apparatus.

7. A remote copy system as claimed in claim 6, wherein when said input unit accepts the input for designating a higher image-quality output than the local apparatus, said process determination unit determines that the image process to be executed is a vectorization process.

8. A remote copy system as claimed in claim 1, further comprising:
an information acquisition unit configured to obtain at least one of an operating state, a physical location, a vectorization speed, a rendering speed, a color space, a color processing speed, a resolution, or a resolution processing speed,
wherein said processing apparatus determination unit identifies performance of the image forming apparatus based on the information acquired by said information acquisition unit, and determines the image forming apparatus that is to perform the image process determined by said process determination unit, based on the identified performance.

9. A remote copy system as claimed in claim 8, wherein said processing apparatus determination unit determines the image forming apparatus that is to perform the image process determined by said process determination unit, based on a data transfer time period over which the data of the image is transferred to the image forming apparatus via the network.

10. A remote copy system as claimed in claim 9, further comprising:
a candidate display unit,
wherein said processing apparatus determination unit is configured to determine at least one candidate for the remote apparatus, and display on said candidate display unit apparatus information on the image forming apparatus as the candidate for the remote apparatus.

11. A remote copy system as claimed in claim 10, wherein the apparatus information displayed on said candidate display unit includes information on a physical location of the image formatting apparatus.

12. An image forming apparatus as one component element of a remote copy system including a plurality of image forming apparatuses connected to a network, from among which an image forming apparatus that reads an original is defined as a local apparatus and an image forming apparatus that performs image formation is defined as a remote apparatus, the remote copy system executing a remote copy in which the remote apparatus performs image formation based on an image of the original read by the local apparatus, the image forming apparatus as one component element comprising:

an input unit configured to accept an input of settings for executing the remote copy;

a process determination unit configured to determine an image process to be executed, based on the settings accepted by said input unit;

a processing apparatus determination unit configured to determine an image forming apparatus, from among the plurality of image forming apparatuses, that is to execute the image process determined by said process determination unit, based on information representing performance of each image forming apparatus;

a remote apparatus determination unit configured to determine the remote apparatus, from among the plurality of image forming apparatuses based on the settings accepted by said input unit; and an execution unit configured to execute the remote copy by causing the image forming apparatus determined by said processing apparatus determination unit to perform the image process determined by said process determination unit on data of the image of the original read by the local apparatus, and causing the remote apparatus to perform image formation based on the data of the image subjected to the image process.

13. A method of controlling an image forming apparatus as one component element of a remote copy system including a plurality of image forming apparatuses connected to a network, from among which an image forming apparatus that reads an original is defined as a local apparatus and an image forming apparatus that performs image formation is defined as a remote apparatus, the remote copy system executing a remote copy in which the remote apparatus performs image formation based on an image of the original read by the local apparatus, the method comprising:

an input step of accepting an input of settings for executing the remote copy;

a process determination step of determining an image process to be executed, based on the settings accepted in said input step;

a processing apparatus determination step of determining an image forming apparatus, from among the plurality of image forming apparatuses, that is to execute the image process determined in said process determination step, based on information representing performance of each image forming apparatus;

a remote apparatus determination step of determining the remote apparatus, from among the plurality of image forming apparatuses, based on the settings accepted in said input step; and an execution step of executing the remote copy by causing the image forming apparatus determined in said processing apparatus determination step to perform the image process determined in said process determination step on data of the image of the original read by the local apparatus, and causing the remote apparatus to perform image formation based on the data of the image subjected to the image process.

14. A non-transitory storage medium storing a control program for causing a computer to execute a method of controlling an image forming apparatus as one component element of a remote copy system including a plurality of image forming apparatuses connected to a network, from among which an image forming apparatus that reads an original is defined as a local apparatus and an image forming apparatus that performs image formation is defined as a remote apparatus, the remote copy system executing a remote copy in which the remote apparatus performs image formation based on an image of the original read by the local apparatus, the method comprising:

an input step of accepting an input of settings for executing the remote copy;

a process determination step of determining an image process to be executed, based on the settings accepted in said input step;

a processing apparatus determination step of determining an image forming apparatus, from among the plurality of image forming apparatuses, that is to execute the image process determined by said process determination step, based on information representing performance of each image forming apparatus;

a remote apparatus determination step of determining the remote apparatus, from among the plurality of image forming apparatuses, based on the settings accepted in said input step; and an execution step of executing the remote copy by causing the image forming apparatus determined in said processing apparatus determination step to perform the image process determined in said process determination step on data of the image of the original read by the local apparatus, and causing the remote apparatus to perform image formation based on the data of the image subjected to the image process.

* * * * *